United States Patent [19]

Mulholland

[11] 3,883,565

[45] May 13, 1975

[54] ESTER OF α-TOCOPHEROL

[75] Inventor: Thomas Patrick Cunningham Mulholland, Macclesfield, England

[73] Assignee: Imperial Chemical Industries Limited, London, England

[22] Filed: Oct. 24, 1973

[21] Appl. No.: 409,315

[30] Foreign Application Priority Data

Oct. 24, 1972 United Kingdom............... 48929/72

[52] U.S. Cl................................ 260/345.5; 424/284
[51] Int. Cl.............................................. C07d 7/22
[58] Field of Search................................. 260/345.5

[56] References Cited
UNITED STATES PATENTS 3,151,127   9/1964   Spanel.......................... 260/345.5 X

*Primary Examiner*—John M. Ford
*Attorney, Agent, or Firm*—Cushman, Darby & Cushman

[57] ABSTRACT

Esters of α-tocopherol with acids related to phenoxyisobutyric acid, especially p-chlorophenoxy-2-methyl-propionic acid. These ester possess hypolipidaemic properties as well as vitamin E activity.

2 Claims, No Drawings

ESTERS OF α-TOCOPHEROL

This invention relates to novel esters and in particular it relates to novel esters of α-tocopherol.

According to the invention there is provided an ester of an α-tocopherol with an acid of the formula:

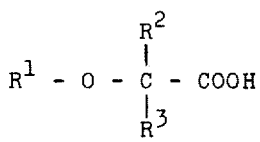

wherein $R^2$ and $R^3$ are both methyl radicals and $R^1$ is a p-chlorophenyl, 4-(p-chlorophenyl)benzyl, 4-(p-chlorophenyl)phenyl or 4-(1,2,3,4-tetrahydronaphth-1-yl)phenyl radical; or $R^2$ is hydrogen, $R^3$ is a p-chlorophenoxy radical and $R^1$ is a p-chlorophenyl radical; or $R^2$ is hydrogen, $R^3$ is a p-clorophenyl radical and $R^1$ is a m-trifluoromethylphenyl radical.

α-Tocopherol, also known as vitamin E, has the formula:

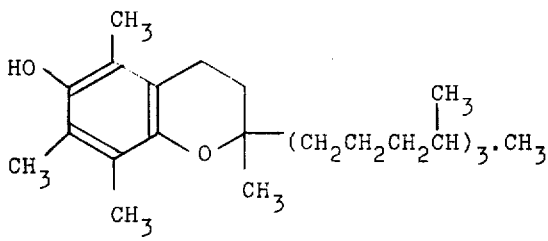

and has the systematic name:

6-hydroxy-2,5,7,8-tetramethyl-2-(4,8,12-trimethyltridecyl)-1-benzopyran

As is evident from the structural formula, it contains three asymmetric carbon atoms, and can thus exist in 8 different diastereoisomeric forms. The term "an α-tocopherol" is thus to be understood as meaning any diastereoisomer or mixture of diastereoisomers whether or not such material is optically active. In particular, the term includes, but is not limited to, the natural α-tocopherol, sometimes called D-α-tocopherol which is the diastereoisomer having the absolute configuration 2R,4'R,8'R, and the synthetic α-tocopherol obtained from phytol which is sometimes called DL-α-tocopherol but which is in fact a mixture of diastereoisomers having the absolute configurations 2R,4'R,8'R and 2S,4'R,8'R. In this specification, the terms D-α-tocopherol and DL-α-tocopherol will be used to signify the compound and mixture of compounds set out above.

The esters according to the invention have the ester group located at the 6-position of the α-tocopherol molecule and the radical thereby obtained has the systematic name:

2,5,7,8-tetramethyl-2-(4,8,12-trimethyltridecyl)-1-benzopyran-6-yl.

However in this specification the term α-tocopheryl will be used to denote the above radical.

Particular esters of the invention are illustrated in the accompanying Examples, and DL-α-tocopheryl 2-(4-chlorophenoxy)-2-methylpropionate and D-α-tocopheryl 2-(4-chlorophenoxy)-2-methylpropionate are preferred.

The esters according to the invention may be obtained by any method known for the preparation of analogous chemical compounds. Thus according to a further feature of the invention there is provided a process for the manufacture of the esters of the invention which comprises esterifying an α-tocopherol with an acid of formula I, wherein $R^1$, $R^2$ and $R^3$ have the meanings stated above, or with a reactive derivative of that acid.

The esterification may be conveniently carried out by reacting an acid halide, preferably an acid chloride or bromide, of the acid of formula I with an α-tocopherol in the presence of a base, for example pyridine, conveniently in an inert diluent or solvent, for example 1,2-dichloroethane. The reaction may be conveniently carried out at a temperature of from 0°C. to 100°C., preferably from 0°C. to 50°C.

Alternatively, the esterification may be carried out by reacting an α-tocopherol with an acid of formula I in the presence of a condensing agent, for example a carbodi-imide, for example dicyclohexylcarbodi-imide, in an inert diluent or solvent.

Again, the esterification may be carried out by a transesterification reaction between an ester of an acid of formula I, for example the methyl or ethyl ester, and an α-tocopherol.

A further alternative method of carrying out the esterification is by reacting an α-tocopherol with an anhydride of an acid of formula I, or a mixed anhydride, for example a mixed anhydride with ethyl hydrogen carbonate.

The esters of the invention possess hypocholesterolaemic and hypolipidaemic properties as well as possessing vitamin E like activity. The hypocholesterolaemic and hypolipidaemic properties are demonstrated by the action of the compounds in reducing the concentration of cholesterol and triglycerides in the serum of rats fed for 13 days on a diet containing the compounds. In this test, a compound is considered to show significant activity if the concentration of cholesterol in the serum is reduced to less than 80 percent of the control value, and the present esters show significant activity at concentrations of 0.2–0,3 percent in the diet.

When used in warm blooded animals for lowering the concentration of cholesterol of lipids in the blood serum of the animals, a daily dose of from 200 mg./kg. to 300 mg./kg. is desirable. When used in man for the same purposes, a typical dose is from 1.5 g. to 2.0 g. per day given orally in divided doses.

The esters of the invention may be administered in the form of pharmaceutical compositions and according to a further feature of the invention there is provided a pharmaceutical composition which comprises an ester of the invention in pharmaceutically acceptable form.

By "pharmaceutically acceptable form" is meant either a pharmaceutical preparation in which the ester is associated with a pharmaceutically acceptable diluent, or a pharmaceutical preparation such as a capsule in which the ester is confined in a unit dosage form without necessarily being associated with a diluent.

Preferred pharmaceutically acceptable forms are those suitable for oral administration, for example tablets, capsules, suspensions or solutions, and such forms should preferably contain from 300 mg. to 600 mg. of the ester per dosage unit.

The invention is illustrated but not limited by the following Examples:

EXAMPLE 1

A solution of 2-(4-chlorophenoxy)-2-methylpropionyl chloride (10.0 g.) in 1,2-dichloroethan (50 ml.) is added dropwise, under nitrogen and below 0°C., to a stirred solution of DL-α-tocopherol (12.0 g.) and pyridine (20 ml.) in 1,2-dichloroethane (50 ml.) during 30 minutes. The mixture is then stirred at 0°C. for 1–2 hours, at ambient temperature for 18–20 hours, and at 40°–45°C. for 20–75 minutes. After cooling, it is mixed with ice-water and ether, and the organic phase is separated and is washed in turn, below 10°C., with 2N hydrochloric acid, water, 10 percent aqueous sodium carbonate, 0.5N aqueous potassium hydroxide, and finally with water until the aqueous phase is no longer alkaline. The extract is dried with sodium sulphate, and evaporated in vacuo. The residual oil is dissolved in light petroleum (b.p. 40°–60°C.) and the solution is run onto a column of alumina (Neutral, Grade 1, 200 g.) made up with light petroleum. The column is washed with light petroleum (300 ml.) which is discarded, and then eluted with the same solvent (900 ml.) followed by a mixture of ether and light petroleum (1:1, 300 ml.). Evaporation of the eluates in vacuo and degassing of the residual oil for 1 hour at 100°C./$10^{-2}$ mm. pressure yields DL-α-tocopheryl 2-(4-chlorophenoxy)-2-methylpropionate (12.2 g. 70 percent) as a pale yellow syrup which is distillable from a bath at 280°C. at $10^{-4}$ mm. pressure. The product shows a single spot on thin layer chromatography (t.l.c.) on silica in benzene or toluene, shows maxima in its infra-red spectrum at 1755 $cm^{-1}$ when in solution in chloroform and at 1762 $cm^{-1}$ and 1752 $cm^{-1}$ when examined as a film; shows maxima in its ultra-violet spectrum at 280, 284 and 287 nm when examined in solution in cyclohexane and shows a mass for the parent ion ($M^+$) of 626 on examination by mass spectrometry.

EXAMPLE 2

The general procedure described in Example 1 is repeated except that only 5.5 g. of DL-α-tocopherol are used and the 10.0 g. of 2-(4-chlorophenoxy)-2-methylpropionyl chloride are replaced by 2-[4-(4-chlorophenyl)benzyloxy]-2-methylpropionyl chloride (5.5 g.). The amounts of 1,2-dichloroethane and pyridine are halved, and alumina column is washed with 150 ml. of light petroleum, which is discarded, and then eluted with light petroleum (2.4 l.), a mixture of light petroleum and benzene (50:1, 600 ml.) and benzene (400 ml.). Evaporation of the eluates and crystallisation of the residue from isopropanol gives DL-α-tocopheryl 2-[4-(4-chlorophenyl)benzyloxy]-2-methylpropionate (5.5 g. 60 percent), m.p. 67°–68°C., showing a single spot on t.l.c. on silica in benzene or chloroform, I.R. maxima at 1750 $cm^{-1}$ in chloroform, 1765 $cm^{-1}$ as a mull and $M^+$ of 716.

The acid chloride used as starting material is prepared as follows:

A mixture of 2-[4-(4-chlorophenyl)benzyloxy]-2-methylpropionic acid (6.4 g.), thionyl chloride (10 ml.) and benzene (20 ml.) is heated under reflux for 30 minutes. The solvent is evaporated and two 20 ml. portions of benzene are added to the residue and then evaporated. The residue is crystallised from light petroleum (b.p. 30°–40°C.) to give the acid chloride, (5.7 g.) m.p. 56°–59°C.

EXAMPLE 3

The general procedure described in Example 1 is repeated except that 10.1 g. of DL-α-tocopherol are used and the 10.0 g. of 2-(4-chlorophenoxy)-2-methylpropionyl chloride are replaced by 10.0 g. of 2-[4-(4-chlorophenyl)phenoxy]-2-methylpropionyl chloride. The final elution of the alumina column needs 800 ml. of a mixture of light petroleum and ether (1:1). Evaporation of the eluates and crystallisation of the residue from isopropanol gives DL-α-tocopheryl 2-[4-(4-chlorophenyl)phenoxy]-2-methylpropionate (9.4 g. 57%), m.p. 52°–54°C., showing a single spot on t.l.c. on silica in benzene, I.R. maxima at 1754 $cm^{-1}$ in chloroform, 1766 $cm^{-1}$ and 1750 $cm^{-1}$ as a mull and $M^+$ of 702.

The acid chloride used as starting material is prepared from 2-[4-(4-chlorophenyl)phenoxy]-2-methylpropionic acid by the same technique as described for the acid chloride in Example 2. The product, after washing with petrol has m.p. 86°–89°C.

EXAMPLE 4

The general procedure described in Example 1 is repeated except that 10.0 g. of DL-α-tocopherol are used and the 10.0 g. of 2-(4-chlorophenoxy)-2-methylpropionyl chloride are replaced by 12.0 g. of DL-2-[4-(1,2,3,4-tetrahydronaphth-1-yl)phenoxy]-2-methylpropionyl chloride. The alumina column is washed with 1400 ml. of light petroleum, which is discarded, and then eluted with a mixture of light petroleum and ether (1:1, 600 ml.). Evaporation of the eluate and degassing of the residual oil for 1 hour at 100°C./$10^{-2}$ mm. pressure gives DL-α-tocopheryl DL-2-[4-(1,2,3,4-tetrahydronaphth-1-yl)phenoxy]-2-methylpropionate (11.3 g. 76 percent) as a syrup. The product shows a single spot on t.l.c. on silica in benzene, I.R. maxima 1754 $cm^{-1}$ in chloroform and 1752 $cm^{+1}$ as a film, U.V. maxima at 279 and 286 nm is cyclohexane and $M^+$ of 722.

The acid chloride used as starting material is prepared from 2-[4-(1,2,3,4-tetrahydronaphth-1-yl)phenoxy]-2-methylpropionic acid by the same technique as described for the acid chloride in Example 2, and is used without purification.

EXAMPLE 5

The general procedure described in Example 1 is repeated except that 7.5 g. of DL-α-tocopherol are used and the 10.0 g. of 2-(4-chlorophenoxy)-2-methylpropionyl chloride are replaced by 7.95 g. of D-L-2-(3-trifluoromethylphenoxy)-2-(4-chlorophenyl)acetyl chloride. The amounts of pyridine and 1,2-dichloroethane are reduced by one third, and the alumina column is washed with light petroleum (1200 ml.), which is discarded, and then eluted with a mixture of light petroleum and ether (1:1, 1200 ml.). Evaporation of the eluate and degassing of the residual oil for 1 hour at 100°C./$10^{-2}$ mm. pressure gives DL-α-tocopheryl DL-2-(3-trifluoromethylphenoxy)-2-(4-chlorophenyl)acetate (10.8 g. 84 percent) as a syrup. The product shows a single spot on t.l.c. on silica in benzene, I.R. maxima 1766 $cm^{-1}$ in chloroform and 1772 as a film, U.V. maxima at 275, 282, and 288 nm in cyclohexane and $M^+$ of 742.

EXAMPLE 6

The general procedure described in Example 1 is repeated except that 9.60 g. of DL-α-tocopherol are used, and the 10.0 g. of 2-(4-chlorophenoxy)-2-methylpropionyl chloride are replaced by 11.90 g. of bis(4-chlorophenoxy)-acetyl chloride. The alumina column (prepared from 250 g. of alumina) is washed with 1.5 l. of light petroleum, which is discarded, then eluted with a mixture of light petroleum and ether (1:1, 600 ml.). Evaporation of the eluate gives DL-α-tocopheryl 2,2-bis(4-chlorophenoxy)acetate (10.6 g., 66 percent, m.p. 50°–60°C.) which crystallises from n-butanol in prisms, m.p. 58°–60°C. The product shows a single spot on t.l.c. on silica in toluene, I.R. maxima at 1738 cm$^{-1}$ in chloroform, 1748 (shoulder at 1730) cm$^{-1}$ as a mull, and M$^+$ of 724.

The acid chloride used as starting material is prepared from bis(4-chlorophenoxy)acetic acid by the same technique as described for the acid chloride in Example 2, except that the benzene is replaced by toluene, and the reflux period is extended to 3 hours.

EXAMPLE 7

The general procedure described in Example 1 is repeated except that DL-α-tocopherol is replaced by D-α-tocopherol. There is thus obtained D-α-tocopheryl 2-(4-chlorophenoxy)-2-methylpropionate (14.5 g., 83 percent) which formed needles m.p. 24°–26°C. The product shows a single spot on t.l.c. on silica in toluene, I.R. maxima at 1755 cm$^{-1}$ in chloroform, 1752–1765 (broad) cm$^{-1}$ as a mull, U.V. maxima at 280, 284 and 288 nm. and M$^+$ of 626.

EXAMPLE 8

The general procedure described in Example 2 is repeated except that the 5.5 g. of DL-α-tocopherol is replaced by 9.5 g. of D-α-tocopherol, and 9.4 g. of 2-[4-(4-chlorophenyl)benzyloxy]-2-methylpropionyl chloride is used instead of 5.5 g. The alumina column (from 250 g of alumina) is washed with 900 ml. of light petroleum which is discarded, and the product is eluted with 900 ml. of a mixture of light petroleum and ether (1:1). Evaporation of the eluate and crystallisation of the residue from isopropanol gives D-α-tocopheryl 2-[4-(4-chlorophenyl)benzyloxy]-2-methylpropionate (8.4 g., 54 percent), m.p. 76°–77°C. The product shows a single spot on t.l.c. on silica in toluene, I.R. maxima at 1744 cm$^{-1}$ in chloroform, 1759 and 1743 (shoulder) cm$^{-1}$ as a mull and M$^+$ of 716.

EXAMPLE 9

A mixture of D-α-tocopherol (4.16 g.), 2-(4-chlorophenoxy)-2-methylpropionic acid anhydride (11.1 g.) and pyridine (2.23 g.) is heated at 115°–120°C. (bath temperature) under nitrogen for 3½ hours. The residue is cooled, dissolved in ether, and the solution is washed in turn with 2N hydrochloric acid, water, aqueous sodium carbonate, and water. It is then dried with sodium sulphate, and evaporated. Crystallisation of the residue from light petroleum (b.p. 40°–60°C.) at −10°C. gives unchanged anhydride (4.8 g.) which is filtered off. The filtrate is chromatographed on 100 g. of neutral grade I alumina, prepared in light petroleum. The column is washed with light petroleum (400 ml.) and the product is then eluted with a mixture of ether and light petroleum (1:1, 200 ml.). Evaporation of the eluate gives D-α-tocopheryl 2-(4-chlorophenoxy)-2-methylpropionate (5.9 g., 96 percent) as a solid m.p. 24°–26°C.

The 2-(4-chlorophenoxy)-2-methylpropionic acid anhydride used as starting material is prepared as follows:

A mixture of N,N$^1$-dicyclohexylcarbodiimide (41.0 g.) and 2-(4-chlorophenoxy)-2-methylpropionic acid (76.9 g.) in ether (100 ml.) is stirred at 0°C. for 2 hours. The precipitate is filtered off and discarded. The filtrate is evaporated, and the residue is crystallised twice from light petroleum (b.p. 40°–60°C.) giving the anhydride (42.3 g., 58 percent), m.p. 63°–64.5°C.

What we claim is:

1. An ester of α-tocopherol with an acid of the formula:

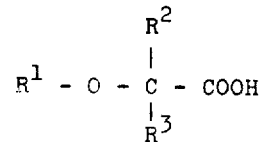

wherein R$^2$ and R$^3$ are both methyl and R$^1$ is p-chlorophenyl, 4-(p-chlorophenyl)benzyl, 4-(p-chlorophenyl)phenyl or 4-(1,2,3,4-tetrahydronaphth-1-yl)phenyl; or R$^2$ is hydrogen, R$^3$ is p-chlorophenoxy and R$^1$ is p-chlorophenyl; or R$^2$ is hydrogen, R$^3$ is p-chlorophenyl and R$^1$ is m-trifluoromethylphenyl.

2. An ester as claimed in claim 1 which is DL-α-tocopheryl 2-(4-chlorophenoxy)-2-methylpropionate or D-α-tocopheryl-2(4-chlorophenoxy)-2-methylpropionate.

* * * * *